United States Patent
Roussel

(10) Patent No.: US 8,374,422 B2
(45) Date of Patent: Feb. 12, 2013

(54) FACE EXPRESSIONS IDENTIFICATION

(75) Inventor: Richard Roussel, Singapore (SG)

(73) Assignee: XID Technologies Pte Ltd., Singapore (SG)

( * ) Notice: Subject to any disclaimer, the term of this patent is extended or adjusted under 35 U.S.C. 154(b) by 105 days.

(21) Appl. No.: 12/736,519

(22) PCT Filed: Apr. 14, 2008

(86) PCT No.: PCT/SG2008/000124
§ 371 (c)(1),
(2), (4) Date: Apr. 4, 2011

(87) PCT Pub. No.: WO2009/128784
PCT Pub. Date: Oct. 22, 2009

(65) Prior Publication Data
US 2011/0188738 A1    Aug. 4, 2011

(51) Int. Cl.
*G06K 9/00*    (2006.01)
(52) U.S. Cl. ........ 382/154; 382/245; 382/118; 382/232; 382/233; 382/128; 382/131; 382/132; 382/209; 382/219; 345/427; 345/473; 345/419; 709/205; 709/206
(58) Field of Classification Search ............... 382/154, 382/245, 118, 232, 233, 128, 131, 132, 209, 382/219; 345/427, 473, 419; 709/205, 206
See application file for complete search history.

(56) References Cited

U.S. PATENT DOCUMENTS

| 6,862,374 B1 | 3/2005 | Nagai et al. | |
| 2007/0127787 A1* | 6/2007 | Castleman et al. | 382/118 |
| 2007/0160306 A1* | 7/2007 | Ahn et al. | 382/245 |

FOREIGN PATENT DOCUMENTS

| EP | 1510973 A2 | 3/2005 |
| KR | 10-2000-0051217 A | 8/2000 |
| KR | 10-2002-0085669 A | 11/2002 |

* cited by examiner

*Primary Examiner* — Mike Rahmjoo
(74) *Attorney, Agent, or Firm* — Axis Intellectual Capital

(57) ABSTRACT

In the last few years, face expression measurement has been receiving significant attention mainly due to advancements in areas such as face detection, face tracking and face recognition. For face recognition systems, detecting the locations in two-dimension (2D) images where faces are present is a first step to be performed before face expressions can be measured. However, face detection from a 2D image is a challenging task because of variability in imaging conditions, image orientation, pose, presence/absence of facial artefacts facial expression and occlusion. Existing efforts to address the shortcomings of existing face recognition systems deal with technologies for creation of three-dimensional (3D) models of a human subject's face based on a digital photograph of the human subject. However, such technologies are computationally intensive nature and susceptible to errors and hence might not be suitable for deployment. An embodiment of the invention describes a method for identifying face expressions of image objects.

22 Claims, 8 Drawing Sheets

FACE EXPRESSIONS IDENTIFICATION

FIELD OF INVENTION

The invention relates to image processing systems. More particularly, the invention relates to a method for identifying face expressions of image objects.

BACKGROUND

In the last few years, face expression measurement has been receiving significant attention and many research demonstrations and commercial applications have been developed as a result. The reasons for the increased interest are multiple but mainly due to advancements in related areas such as face detection, face tracking and face recognition as well as the recent availability of relatively cheap computational power. Face expression measurement is widely applicable to different areas such as image understanding, psychological studies, facial nerve grading in medicine, face image compression, synthetic face animation, video indexing, robotics and virtual reality.

Face expressions are generated by contractions of facial muscles, which result in temporary deformed facial features such as eyelids, eyebrows, nose, lips and skin texture, often revealed by wrinkles and bulges. Typical changes of muscular activities are often brief, lasting for a few seconds, but rarely more than five seconds or less than 250 milliseconds. Face expression intensities are measurable by determining either geometric deformations of facial features or the density of wrinkles appearing in certain face regions. Two main methodological approaches typically used for measuring the characteristics of face expressions are: judgement-based and sign vehicle-based approaches.

An initial step performed by a typical face recognition system is to detect locations in an image where faces are present. Although there are many other related problems of face detection such as face localization, facial feature detection, face identification, face authentication and face expression recognition, face detection is still considered as one of the foremost problem in respect of difficulty. Most existing face recognition systems typically employ a single two-dimension (2D) representation of the face of the human subject for inspection by the face recognition systems. However, face detection based on a 2D image is a challenging task because of variability in imaging conditions, image orientation, pose, presence or absence of facial artefacts, face expression and occlusion.

Efforts to address the shortcomings of existing face recognition systems deal with technologies for creation of three-dimensional (3D) models of a human subject's face based on a 2D digital photograph of the human subject. However, such technologies are inherently susceptible to errors since the computer is merely extrapolating a 3D model from a 2D photograph. In addition, such technologies are computationally intensive and hence might not be suitable for deployment in face recognition systems where speed and accuracy are essential for satisfactory performance.

Hence, in view of the foregoing problems, there affirms a need for a method for providing improved face detection to enable face expressions identification of image objects.

SUMMARY

Embodiments of the invention disclosed herein provide a method for identifying face expressions of an image object.

In accordance with a first aspect of the invention, there is disclosed a properties measurement method comprising providing an image of the image object in which the image is a two-dimensional (2D) representation of the face of the image object. The method also comprises providing a three-dimensional (3D) mesh having a first plurality of mesh reference points and a second plurality of mesh reference points in which the first plurality of mesh reference points and the second plurality of mesh reference points are predefined. In addition, the method comprises identifying a plurality of feature portions of the image object from the image and identifying a first plurality of image reference points and a second plurality of image reference points based on the plurality of feature portions of the image object. The first plurality of image reference points and the second plurality of image reference points have 3D coordinates. Further, the method comprises at least one of manipulating and deforming the 3D mesh by compensating the first plurality of mesh reference points accordingly towards the first plurality of image reference points. The deformed 3D mesh displaces the second plurality of mesh reference points. Lastly, the method comprises identifying difference between the displaced second plurality of mesh reference points and the second plurality of image reference points for obtaining a first profile and identifying a face expression of the image object based on the first profile. The difference is obtained by comparing the inter-configuration of the displaced second plurality of mesh reference points with the inter-configuration of the second plurality of image reference points.

In accordance with a second aspect of the invention, there is disclosed a device readable medium having stored therein a plurality of programming instructions, which when execute by a machine, the instructions cause the machine to provide an image of the image object in which the image is a two-dimensional (2D) representation of the face of the image object. The instructions also cause the machine to provide a three-dimensional (3D) mesh having a first plurality of mesh reference points and a second plurality of mesh reference points in which the first plurality of mesh reference points and the second plurality of mesh reference points are predefined. In addition, the instructions cause the machine to identify a plurality of feature portions of the image object from the image and identify a first plurality of image reference points and a second plurality of image reference points based on the plurality of feature portions of the image object. The first plurality of image reference points and the second plurality of image reference points have 3D coordinates. Further, the instructions cause the machine to at least one of manipulate and deform the 3D mesh by compensating the first plurality of mesh reference points accordingly towards the first plurality of image reference points. The deformed 3D mesh displaces the second plurality of mesh reference points. Lastly, the instructions cause the machine to identify difference between the displaced second plurality of mesh reference points and the second plurality of image reference points for obtaining a first profile and identify a face expression of the image object based on the first profile. The difference is obtained by comparing the inter-configuration of the displaced second plurality of mesh reference points with the inter-configuration of the second plurality of image reference points.

BRIEF DESCRIPTION OF THE DRAWINGS

Embodiments of the invention are disclosed hereinafter with reference to the drawings, in which.

DETAILED DESCRIPTION

Figure 1:
FIG. 1 is a two-dimensional (2D) image of a human subject to be inspected by a facial recognition system employing the face-synthesizing techniques provided in accordance with an embodiment of the present invention.

A method for identifying face expressions of an image object is described hereinafter for addressing the foregoing problems.

For purposes of brevity and clarity, the description of the invention is limited hereinafter to applications related to face expressions identification. This however does not preclude various embodiments of the invention from other applications of similar nature. The fundamental inventive principles of the embodiments of the invention are common throughout the various embodiments.

Exemplary embodiments of the invention described hereinafter are in accordance with FIGS. 1 to 8 of the drawings, in which like elements are numbered with like reference numerals.

FIG. 1 shows a two-dimensional (2D) image 100 representation of a human subject to be inspected using face recognition. The 2D image 100 preferably captures a frontal view of the face of the human subject in which the majority of the facial features of the human subject are clearly visible. The facial features include one or more of the eyes, the nose and the mouth of the human subject. By clearly showing the facial features of the human subject in the 2D image 100, the synthesizing of an accurate representation of a three-dimensional (3D) head object of the human subject can then be performed subsequently. In addition, the 2D image 100 is preferably acquired using a device installed with either a charge-coupled device (CCD) or a complementary metal-oxide-semiconductor (CMOS) sensor. Examples of the device include digital cameras, webcams and camcorders.

Figure 2:
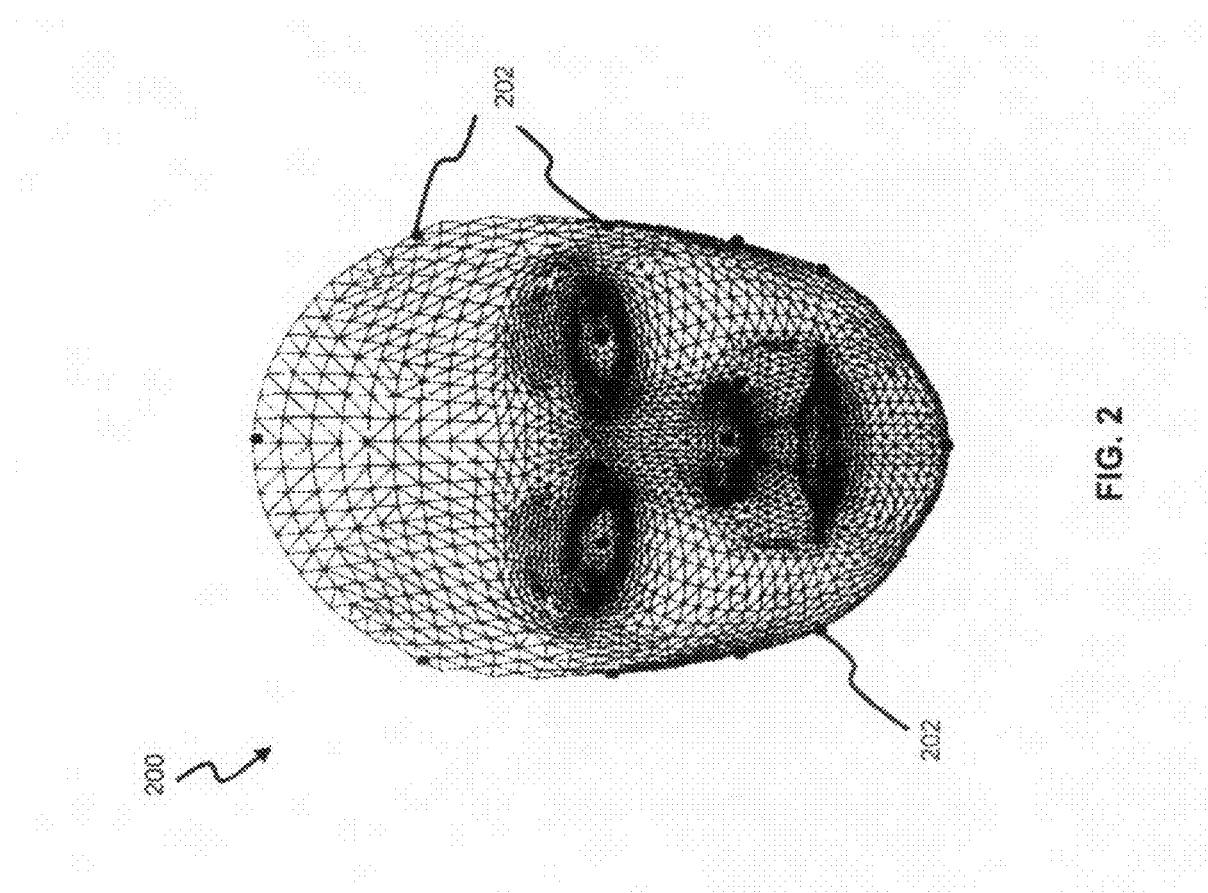
FIG. 2 is a generic three-dimensional (3D) mesh representation of the head of a human subject.
Figure 3:
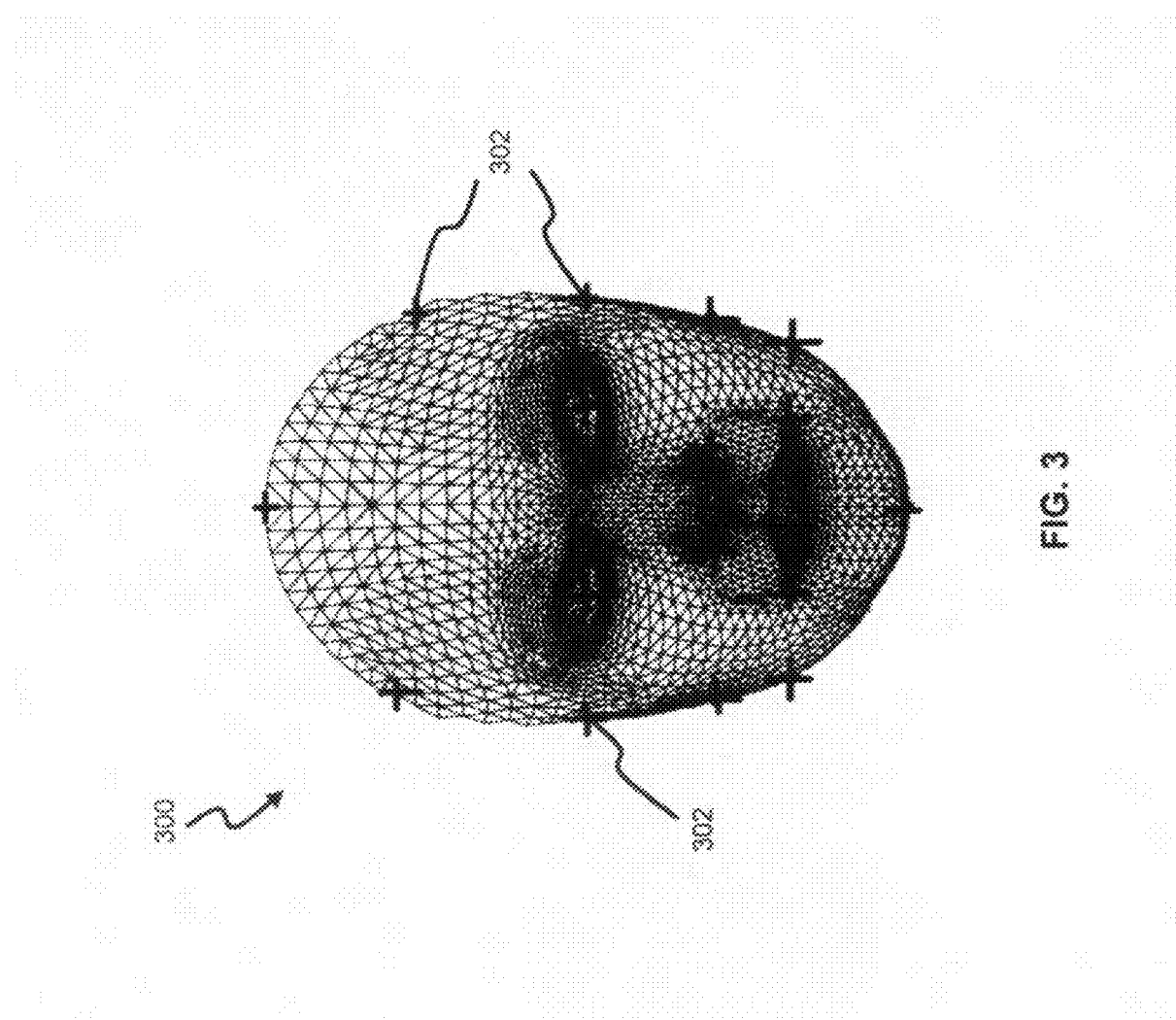
FIG. 3 shows the identification of feature portions of the 3D mesh of FIG. 2.

FIG. 2 shows a 3D mesh 200 representing the face of a human subject. The 3D mesh 200 is a generic face model constructed from sampled data obtained from faces of human subjects representing a population cross-section. In addition, the 3D mesh 200 is provided with a plurality of predefined mesh reference points 202. The plurality of mesh reference points 202 is then further separated into two sets: a first plurality of mesh reference points and a second plurality of mesh reference points. The first plurality of mesh reference points comprises markings such as on the left and upper contours, and the left and right lower contours, in which the markings are subsequently adjusted for performing global deformation of the 3D mesh 200. Separately, the second plurality of mesh reference points comprises markings around key facial features such as on the left and right eye center, the left and right nose lobe, and the left and right lip ends, in which the markings are also subsequently adjusted for performing local deformation of the 3D mesh 200. The markings 302 of the first plurality of mesh reference points and the second plurality of mesh reference points are as shown in FIG. 3. The 3D mesh 200 is then later adapted to the face of the human subject to be inspected using face recognition.

Figure 4:
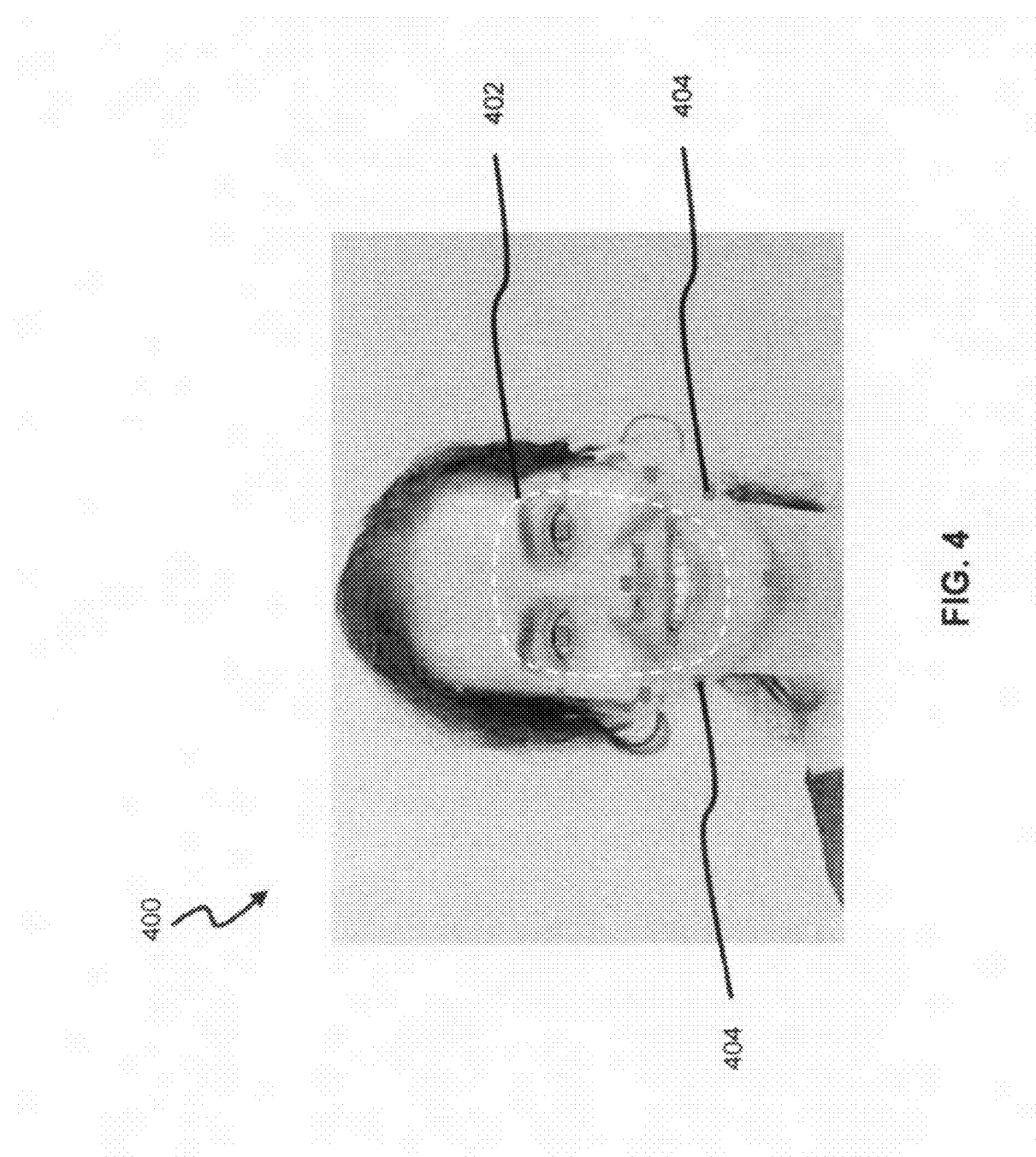
FIG. 4 is an image in which feature portions of the human subject in the image of FIG. 1 are identified.

From the 2D image 100 of FIG. 1, a plurality of feature portions of the face of the human subject is then identified as shown in FIG. 4. The plurality of feature portions preferably comprises the eyes, the mouth and the nose of the face of the human subject. In addition, the plurality of feature portions is identified by locating the face of the human subject in the 2D image 100. The face of the human subject is locatable in the 2D image 100 using methods well known in the art such as knowledge-based methods, feature invariant approaches, template matching methods and appearance-based methods. After the face is located in the 2D image 100, a region of the face 402 is next identified in order to locate important facial features of the human subject. Notably, the facial features correspond to the plurality of feature portions. The identified facial features contained in the region of the face 402 are then detected using edge detection techniques well known in the art.

The identified plurality of feature portions is then marked with a plurality of image reference points 404 using a feature extractor as shown in FIG. 4. Specifically, each of the plurality of image reference points 404 has 3D coordinates. In order to obtain substantially accurate 3D coordinates of each of the plurality of image reference points 404, the feature extractor requires prior training in which the feature extractor is taught how to identify and mark image reference points using training images that are manually labelled and are normalized at a fixed ocular distance. For example, by using an image in which there is a plurality of image feature points, each image feature point (x, y) is first extracted using multi-resolution 2D gabor wavelets that are taken in eight different scale resolution and from six different orientations to thereby produce a forty-eight dimensional feature vector.

Next, in order to improve the extraction resolution of the feature extractor around an image feature point (x, y), counter solutions around the region of the image feature point (x, y) are collected and the feature extractor is trained to reject the counter solutions. All extracted feature vectors (also known as positive samples) of a image feature point are then stored in a stack "A" while the feature vectors of counter solutions (also known as negative samples) are then stored in a corresponding stack "B". This then provides a forty-eight dimensional feature vector and dimensionality reduction using principal component analysis (PCA) is then required. Thus, dimensionality reduction is performed for both the positive samples (PCA_A) and the negative samples (PCA_B).

The separability between the positive samples and the negative samples is optimized using linear discriminant analysis (LDA). The LDA computation of the positive samples is performed by using the positive samples and negative samples as training sets. Two different sets, PCA_A(A) and PCA_A(B), are then created from the projection of the positive samples. The set PCA_A(A) is assigned as class "0" and the set PCA_A(B) is assigned as class "1". The best linear discriminant is then defined using the fisher linear discriminant analysis on the basis of a two-class problem. The linear discriminant analysis of the set PCA_A(A) is obtained by computing LDA_A(PCA_A(A)) since a "0" value must be generated. Similarly, the linear discriminant analysis of the set PCA_A(B) is obtained by computing LDA_A(PCA_A(B)) since a "1" value must be generated. The separability threshold present between the two classes is then estimated.

Separately, LDA_B undergoes the same process as explained afore for LDA_A. However, instead of using the sets, PCA_A(A) and PCA_A(B), the sets PCA_B(A) and PCA_B(B) are used. Two scores are then obtained by subjecting an unknown feature vector, X, through the following two processes:

$$X \Rightarrow PCA\_A \Rightarrow LDA\_A \quad (1)$$

$$X \Rightarrow PCA\_B \Rightarrow LDA\_B \quad (2)$$

The feature vector, X, is preferably accepted by the process LDA_A(PCA_A(X)) and is preferably rejected by the process LDA_B(PCA_B(X)). The proposition is that two discriminant functions are defined for each class using a decision rule being based on the statistical distribution of the projected data:

$$f(x)=LDA\_A(PCA\_A(x)) \quad (3)$$

$$g(x)=LDA\_B(PCA\_B(x)) \quad (4)$$

Set "A" and set "B" are defined as the "feature" and "non-feature" training sets respectively. Further, four one-dimensional clusters are also defined: GA=g(A), FB=f(B), FA=f(A) and GB=f(b). The derivation of the mean, $\bar{x}$, and standard deviation, $\sigma$, of each of the four one-dimensional clusters, FA, FB, GA and GB, are then computed. The mean and standard deviation of FA, FB, GA and GB are respectively expressed as $(\bar{x}_{FA}, \sigma_{FA})$, $(\bar{x}_{FB}, \sigma_{FB})$, $(\bar{x}_{GA}, \sigma_{GA})$, and $(\bar{x}_{GB}, \sigma_{GB})$. Additionally, for a given vector Y, the projections of the vector Y using the two discriminant functions are obtained:

$$yf=f(Y) \quad (5)$$

$$yg=g(Y) \quad (6)$$

Further, let $$yfa = \frac{|yf - mFA|}{sFA},$$

$$yfb = \frac{|yf - mFB|}{sFB},$$

$$yga = \frac{|yf - mGA|}{sGA} \text{ and}$$

$$ygb = \frac{|yf - mGB|}{sGB}.$$

The vector Y is then classified as class "A" or "B" according to the pseudo-code, which is expressed as:

```
if (min(yfa, yga) < min(yfb, ygb)) then
    label = A ;           else
    label = B ;
    RA = RB = 0 ;
if (yfa > 3.09)or(yga > 3.09) RA = 1 ;
if (yfb > 3.09)or(ygb > 3.09) RB = 1 ;
if (RA = 1)or(RB = 1) label = B ;
if (RA = 1)or(RB = 0) label = B ;
if (RA = 0)or(RB = 1) label = A ;
```

Preferably, the plurality of image reference points 404 in 3D are correlated with and estimated from the feature portions of the face in 2D space by a pre-determined function. In addition, as shown in FIG. 4, the plurality of image reference points 404 being marked on the 2D image 100 are preferably the left and right eyes center, nose tip, the left and right nose lobes, the left and upper contours, the left and right lower contours, the left and right lip ends and the chin tip contour.

The head pose of the human subject in the 2D image 100 needs to be estimated before the 3D mesh 200 can be deformed. First, the 3D mesh 200 is rotated at an azimuth angle, and edges are extracted using an edge detection algorithm such as the Canny edge detector. 3D mesh-edge maps are then computed for the 3D mesh 200 for azimuth angles ranging from −90 degrees to +90 degrees, in increments of 5 degrees. Preferably, the 3D mesh-edge maps are computed only once and stored off-line in an image array.

To estimate the head pose in the 2D image 100, the edges of the 2D image 100 are extracted using the edge detection algorithm to obtain an image edge map (not shown) of the 2D image 100. Each of the 3D mesh-edge maps is compared to the image edge map to determine which pose results in the best overlap of the 3D mesh-edge maps. To compute the disparity between the 3D mesh-edge maps, the Euclidean distance-transform (DT) of the image edge map is computed. For each pixel in the image edge map, the DT process assigns a number that represents the distance between that pixel and the nearest non-zero pixel of the image edge map.

The value of the cost function, F, of each of the 3D mesh-edge maps is then computed. The cost function, F, which measures the disparity between the 3D mesh-edge maps and the image edge map is expressed as:

$$F = \frac{\sum_{(i,j) \in A_{EM}} DT(i, j)}{N} \quad (7)$$

where $A_{EM} \cong \{(i, j):EM(i, j)=1\}$ and N is the cardinality of set $A_{EM}$ (total number of nonzero pixels in the 3D mesh-edge map EM). F is the average distance-transform value at the nonzero pixels of the image edge map. The pose for which the corresponding 3D mesh-edge map results in the lowest value of F is the estimated head-pose for the 2D image 100.

Figure 5:
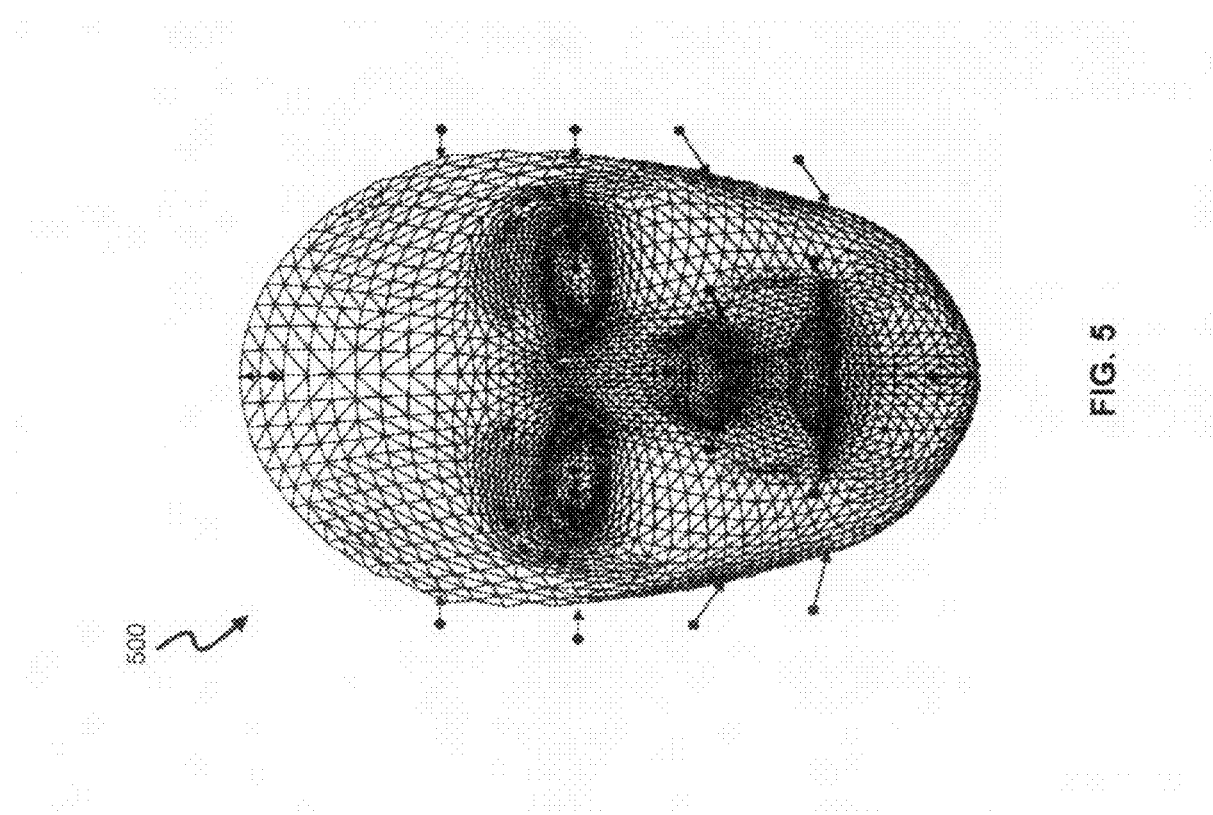
FIG. 5 shows global and local deformations being applied to the 3D mesh of FIG. 3.
Figure 6:
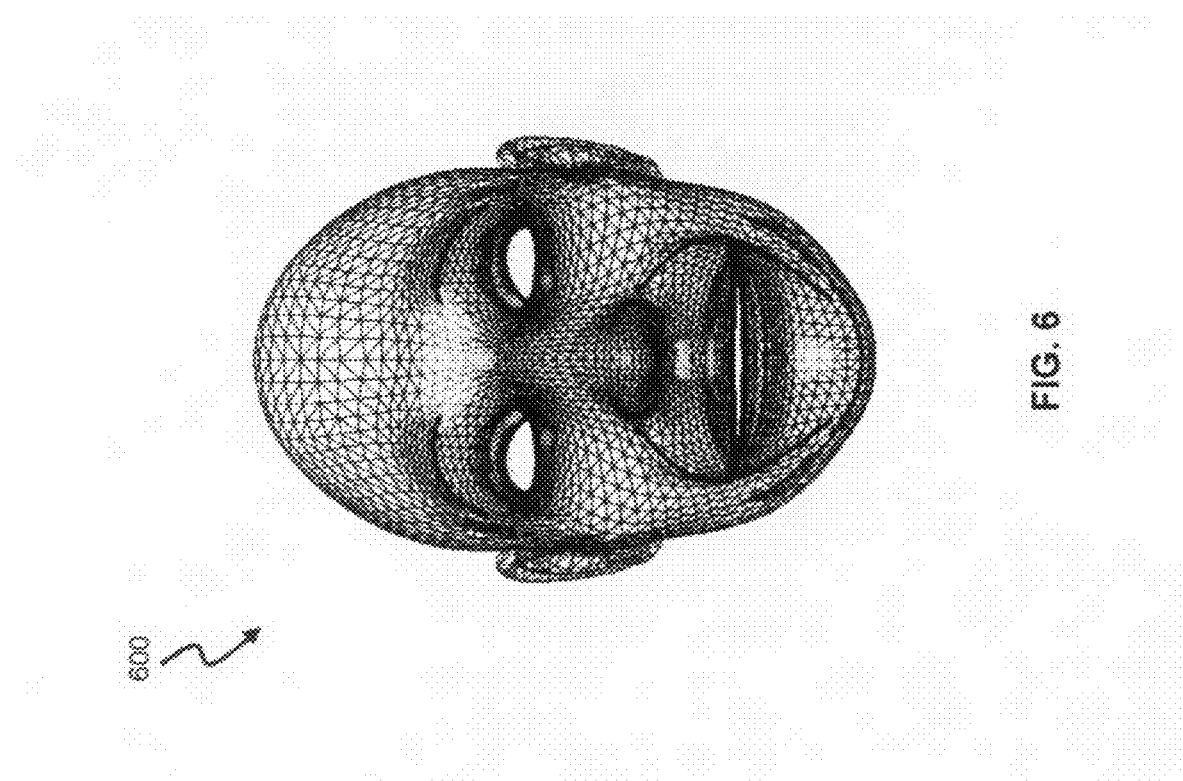
FIG. 6 shows an image of a synthesized 3D head object of the human subject in the 2D image of FIG. 1.

Once the pose of the human subject in the 2D image 100 is known, the 3D mesh 200 undergoes global deformation for registering the 3D mesh 200 to the 2D image 100. The deformation of the 3D mesh 200 is shown in FIG. 5. Typically, an affine deformation model for the global deformation of the 3D mesh 200 is used and the plurality of image reference points 404 is used to determine a solution for the affine parameters. A typical affine model used for the global deformation is expressed as:

$$\begin{bmatrix} X_{gb} \\ Y_{gb} \\ Z_{gb} \end{bmatrix} = \begin{bmatrix} a_{11} & a_{12} & 0 \\ a_{21} & a_{22} & 0 \\ 0 & 0 & \frac{1}{2}a_{11} + \frac{1}{2}a_{22} \end{bmatrix} \begin{bmatrix} X \\ Y \\ Z \end{bmatrix} + \begin{bmatrix} b_1 \\ b_2 \\ 0 \end{bmatrix} \quad (8)$$

where (X, Y, Z) are the 3D coordinates of the vertices of the 3D mesh 200, and subscript "gb" denotes global deformation. The affine model appropriately stretches or shrinks the 3D mesh 200 along the X and Y axes and also takes into account the shearing occurring in the X-Y plane. The affine deformation parameters are obtained by minimizing the re-projection error of the first plurality of mesh reference points on the rotated deformed 3D mesh 200 and the corresponding 2D locations in the 2D image 100. The 2D projection $(x_f, y_f)$ of the 3D feature points $(X_f, Y_f, Z_f)$ on the deformed 3D mesh 200 is expressed as:

$$\begin{bmatrix} x_f \\ y_f \end{bmatrix} = \underbrace{\begin{bmatrix} r_{11} & r_{12} & r_{13} \\ r_{21} & r_{22} & r_{23} \end{bmatrix}}_{R_{12}} \begin{bmatrix} a_{11}X_f + a_{12}Y_f + b_1 \\ a_{12}X_f + a_{22}Y_f + b_2 \\ \frac{1}{2}(a_{11} + a_{22})Z_f \end{bmatrix} \quad (9)$$

where $R_{12}$ is the matrix containing the top two rows of the rotation matrix corresponding to the estimated head pose for the 2D image 100. By using the 3D coordinates of the plurality of image reference points 404, equation (9) can then be reformulated into a linear system of equations. The affine deformation parameters $P=[a_{11}, a_{12}, a_{21}, a_{22}, b_1, b_2]^T$ are then determinable by obtaining a least-squares (LS) solution of the linear system of equations. The 3D mesh 200 is globally deformed according to these parameters, thus ensuring that the 3D head object 600 created conforms with the approximate shape of the face of the human subject and the significant features are properly aligned. The 3D head object 600 is shown in FIG. 6. In addition, to more accurately adapt the 3D mesh 200 to the human subject's face from the 2D image 100, local deformations are introducible in the globally deformed 3D mesh 200. Local deformations of the 3D mesh 200 are performed using the second plurality of mesh reference points, in which the vertices of the 3D mesh 200 are displaced via perturbations.

Figure 7:
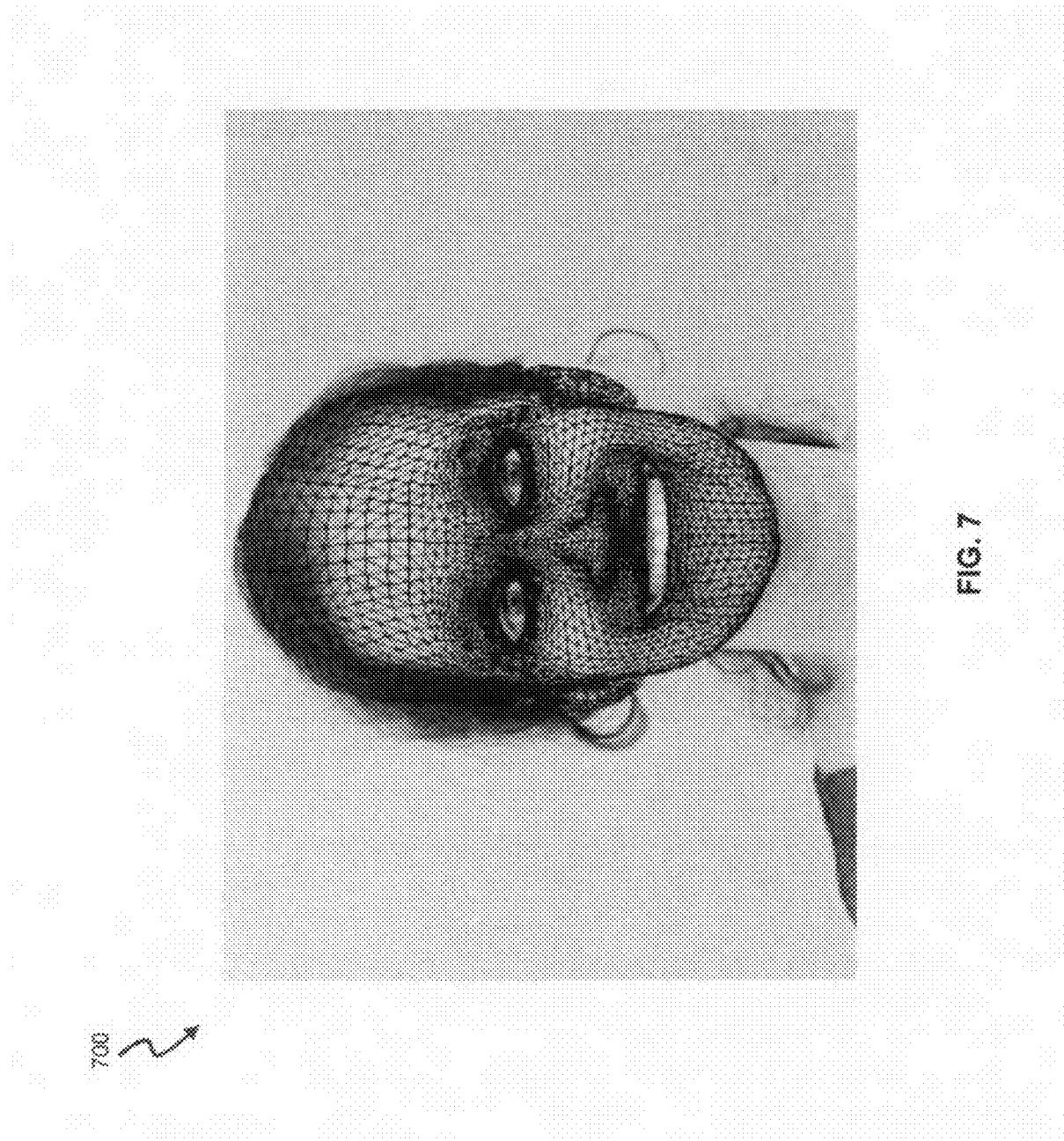
FIG. 7 shows an image in which the synthesized 3D head object of FIG. 6 is fitted to the human subject in the 2D image of FIG. 1.
Figure 8:
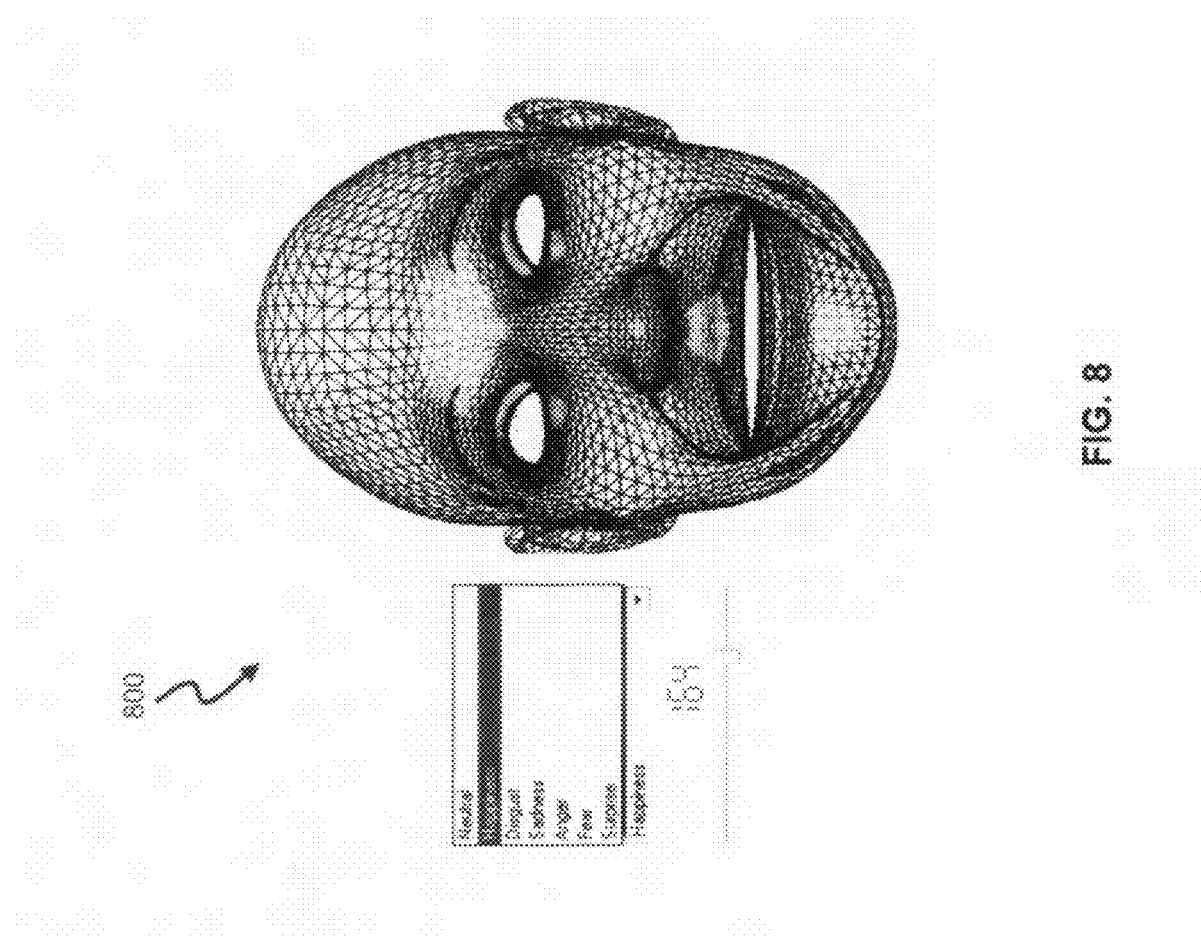
FIG. 8 shows identification of face expression of the synthesized 3D head object of FIG. 6.

Once the 3D mesh 200 is adapted and deformed according to the 2D image 100, the 3D head object 600 is then custom fitted, as shown in FIG. 7, to an image object being representative of the face of the human subject in the 2D image of FIG. 1. The custom fitting ensures that the synthesized 3D head object 600 is an approximate representation of the face expression as depicted by the human subject in the 2D image 100. In addition, the face expression is measured by identifying the difference between the displaced second plurality of mesh reference points and the second plurality of image reference points for obtaining a first profile. The second plurality of mesh reference points is displaced when the 3D mesh is adapted and deformed in accordance to the 2D image 100. The difference is obtained by comparing the inter-configuration of the displaced second plurality of mesh reference points with the inter-configuration of the second plurality of image reference points. The first profile is then compared against a database that contains reference profiles for obtaining a statistical match. The reference profiles are pre-computed and correspond to representation of different facial expressions of human subjects from the population cross-section. Hence, by obtaining the statistical match of the first profile against the reference profiles stored in the database, the face expression of the human subject in the 2D image 100 of FIG. 1 is identifiable. FIG. 8 shows the correct identification of the face expression depicted by the human subject in the 2D image 100.

Alternatively, the face expression depicted by the human subject in the 2D image 100 is measurable using inter-configuration between the different facial muscle groups. Typical facial muscle groups are defined together with the 3D mesh 200. Each muscle of each muscle group has a reference state and can be deformed away from the reference state, for example by muscle contraction, to provide the 3D mesh 200 with an expression. Preferably, the 3D mesh 200 is expressionless when each muscle of the muscle group is in the reference state. Thus when the 3D mesh 200 undergoes global and local deformation as shown in FIG. 5, the respective muscles groups and the reference state of each respective muscle of the muscle groups are deformed and redefined accordingly. The degree of deformation of the respective muscle groups are then obtained by comparing with the same muscle groups in the expressionless state. The degree of deformation of the respective muscle groups is also known as the normalized difference. Hence, in this manner, an expression profile corresponding to an inter-configuration of the interactions between the different muscle groups, which represent the face expression of the human subject in the 2D image 100 is obtained. The expression profile is then compared against a database that contains reference expression profiles for obtaining a statistical match. Each of the reference expression profiles is pre-computed and corresponds to an inter-configuration of the muscle groups for a particular face expression. Together, the reference expression profiles comprise all possible face expressions displayable by human subjects in a population cross-section. The face expression of the human subject in the 2D image 100 is then correctly identified as shown in FIG. 8 when a statistical match is obtained.

In the foregoing manner, a method for identifying face expressions of image objects is described according to embodiments of the invention for addressing at least one of the foregoing disadvantages. Although a few embodiments of the invention are disclosed, it will be apparent to one skilled in the art in view of this disclosure that numerous changes and/or modification can be made without departing from the spirit and scope of the invention.

The invention claimed is:

1. A properties measurement method, the method comprising:
   providing an image of the image object, the image being a two-dimensional (2D) representation of the face of the image object;
   providing a three-dimensional (3D) mesh having a first plurality of mesh reference points and a second plurality of mesh reference points, the first plurality of mesh reference points and the second plurality of mesh reference points being predefined;
   identifying a plurality of feature portions of the image object from the image;
   identifying a first plurality of image reference points and a second plurality of image reference points based on the plurality of feature portions of the image object, the first plurality of image reference points and the second plurality of image reference points having 3D coordinates;
   at least one of manipulating and deforming the 3D mesh by compensating the first plurality of mesh reference points accordingly towards the first plurality of image reference points, the deformed 3D mesh displacing the second plurality of mesh reference points;
   identifying difference between the displaced second plurality of mesh reference points and the second plurality of image reference points for obtaining a first profile, the difference being obtained by comparing the inter-configuration of the displaced second plurality of mesh reference points with the inter-configuration of the second plurality of image reference points; and
   identifying a face expression of the image object based on the first profile, wherein one or more steps is performed using a processor.

2. The method as in claim 1, further comprising:
   providing a plurality of profiles, each of the plurality of profiles corresponding to each of a plurality of face expressions of a reference image object; and
   comparing the first profile against each of the plurality of facial profiles for obtaining a match to thereby identify the face expression of the image object.

3. The method as in claim 2, wherein each of the plurality of profiles comprises a plurality of facial muscles interacting with one another to thereby provide each of the plurality of face expressions of the reference image object, each of the plurality of facial muscles having a reference state.

4. The method as in claim 3, wherein at least one of manipulating and deforming the 3D mesh further comprises:
   redefining the reference state of each of the plurality of facial muscles based on deformation of the 3D mesh;
   determining a current state of each of the plurality of facial muscles after deformation thereof; and
   determining the difference between the current state and the reference state of each of the plurality of facial muscles.

5. The method as in claim 3, wherein the reference image object is the face of a person.

6. The method as in claim 1, wherein the 3D mesh is a reference 3D mesh representation of the face of a person.

7. The method as in claim 1, wherein the image object is the face of a person.

8. The method as in claim 7, wherein the plurality of feature portions of the face is at least one of the eyes, the nose, the nostrils and the mouth of the person.

9. The method as in claim 1, wherein properties of the feature portions of the image object in the image is identifiable using principal components analysis (PCA).

10. The method as in claim 1, wherein providing the image of the image object comprises acquiring the image of the image object using an image capture device.

11. The method as in claim 10, wherein the image capture device is one of a charge-coupled device (CCD) and a complementary metal-oxide-semiconductor (CMOS) sensor.

12. A non-transitory device readable medium having stored therein a plurality of programming instructions, which when execute by a machine, the instructions cause the machine to:
   provide an image of the image object, the image being a two-dimensional (2D) representation of the face of the image object;
   provide a three-dimensional (3D) mesh having a first plurality of mesh reference points and a second plurality of mesh reference points, the first plurality of mesh reference points and the second plurality of mesh reference points being predefined;
   identify a plurality of feature portions of the image object from the image;
   identify a first plurality of image reference points and a second plurality of image reference points based on the plurality of feature portions of the image object, the first plurality of image reference points and the second plurality of image reference points having 3D coordinates;
   at least one of manipulate and deform the 3D mesh by compensating the first plurality of mesh reference points accordingly towards the first plurality of image reference points, the deformed 3D mesh displacing the second plurality of mesh reference points;
   identify difference between the displaced second plurality of mesh reference points and the second plurality of image reference points for obtaining a first profile, the difference being obtained by comparing the inter-configuration of the displaced second plurality of mesh reference points with the inter-configuration of the second plurality of image reference points; and
   identify a face expression of the image object based on the first profile.

13. The device readable medium as in claim 12, wherein the programming instructions, which when executed by a machine, cause the machine to further:
   provide a plurality of profiles, each of the plurality of profiles corresponding to each of a plurality of face expressions of a reference image object; and
   compare the first profile against each of the plurality of facial profiles for obtaining a match to thereby identify the face expression of the image object.

14. The device readable medium as in claim 13, wherein each of the plurality of profiles comprises a plurality of facial muscles interacting with one another to thereby provide each of the plurality of face expressions of the reference image object, each of the plurality of facial muscles having a reference state.

15. The device readable medium as in claim 14, wherein at least one of manipulating and deforming the 3D mesh further comprises:
   redefining the reference state of each of the plurality of facial muscles based on deformation of the 3D mesh;
   determining a current state of each of the plurality of facial muscles after deformation thereof; and
   determining the difference between the current state and the reference state of each of the plurality of facial muscles.

16. The device readable medium as in claim 14, wherein the reference image object is the face of a person.

17. The device readable medium as in claim 12, wherein the 3D mesh is a reference 3D mesh representation of the face of a person.

18. The device readable medium as in claim 12, wherein the image object is the face of a person.

19. The device readable medium as in claim 18, wherein the plurality of feature portions of the face is at least one of the eyes, the nose, the nostrils and the mouth of the person.

20. The device readable medium as in claim 12, wherein properties of the feature portions of the image object in the image is identifiable using principal components analysis (PCA).

21. The device readable medium as in claim 12, wherein providing the image of the image object comprises acquiring the image of the image object using an image capture device.

22. The device readable medium as in claim 21, wherein the image capture device is one of a charge-coupled device (CCD) and a complementary metal-oxide-semiconductor (CMOS) sensor.

* * * * *